United States Patent [19]

Schlicklin et al.

[11] 4,294,617

[45] Oct. 13, 1981

[54] COMPOSITIONS AND METHODS FOR THE DENATURATION OF WATER-BASE PAINTS

[75] Inventors: Philippe Schlicklin, Nancy; Anne-Marie Mertzweiller nee Maillard, Maidières; Jacques Ploussard, Pont a Mousson, all of France

[73] Assignee: Air Industrie, France

[21] Appl. No.: 141,796

[22] Filed: Apr. 21, 1980

Related U.S. Application Data

[63] Continuation of Ser. No. 938,909, Sep. 1, 1978, abandoned.

[30] Foreign Application Priority Data

Sep. 6, 1977 [FR] France ............................ 77 26948

[51] Int. Cl.³ .............................................. C09D 5/08
[52] U.S. Cl. .............................. 106/14.37; 106/14.38; 106/14.39; 106/14.42; 106/14.43; 106/287.18; 106/287.23; 134/38
[58] Field of Search .................. 106/287.18, 287.23, 106/14.13, 14.37, 14.38, 14.39, 14.42, 14.43; 134/38

[56] References Cited

U.S. PATENT DOCUMENTS

| | | | |
|---|---|---|---|
| 2,618,603 | 11/1952 | Schaeffer | 106/14.15 |
| 4,055,404 | 10/1977 | Daimer | 134/38 |
| 4,067,806 | 1/1978 | Mauceri | 134/38 |
| 4,090,001 | 5/1978 | Mertzweiller | 134/38 |

*Primary Examiner*—Lorenzo B. Hayes
*Attorney, Agent, or Firm*—Larson and Taylor

[57] ABSTRACT

The invention relates to denaturation compositions for waterbase paints. These compositions are constituted by aqueous solutions containing effective amounts of at least one sulphate of iron (II), of magnesium or of manganese. To control the precipitation conditions of the denatured paint, these solutions may also contain a surface active agent which is a polyether of the form

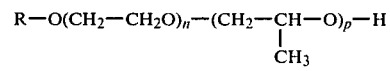

in which R is an alkyl, aryl, aryl-alkyl or alkyl-aryl group, containing at least 10 carbon atoms, and n and p are whole numbers of which one may be zero, n+p being comprised between 12 and 100.

9 Claims, No Drawings

COMPOSITIONS AND METHODS FOR THE DENATURATION OF WATER-BASE PAINTS

This is a continuation of application Ser. No. 938,909 filed Sept. 1, 1978, now abandoned.

The invention relates to denaturation compositions for water-base paints and to the methods in which these compositions are applied.

By "water-base" paints, is meant generally all paints in which the solvent contains a high proportion of water. This proportion, in the paint such as it is used, is normally over 50%. This does not exclude the presence of a fraction of organic solvent in the composition. The designation "water-base" (water-soluble) also covers true solutions; this is the case in particular for certain paints based on alkyd, acrylic and epoxy resins, as emulsions, or dispersions, notably for certain vinyl or acrylic based paints or again combinations of these two types. In the following description, the term water-base paint is to be taken in its widest sense.

The "denaturation" of a paint denotes the treatment by which the physico-chemical characteristics of a paint are modified so that the latter cannot form a strongly adherent deposit on the articles with which it happens to be in contact.

It is essentially when the paint is applied by spraying that the problem arises. In fact, a non-negligible portion of the paint used is not applied to the articles to be coated. So it is necessary to avoid this unused paint forming troublesome deposits in the equipment.

To treat the excess paint and to avoid its deposition on the walls, the spray booths may be arranged in various ways. A customary arrangement consists of producing a flow or circulation of air in the booth, the air loaded with paint particles then being brought into contact with running water in order to be freed from the paint aerosol. In the booth the air generally passes from the ceiling to the floor, but may also be removed laterally, the principle remaining the same. The water loaded with particles is collected, then sent to the treatment installation to remove the paint.

Whatever the device adopted, in all cases, the presence, in the running water, of denaturating compounds must ensure treatment of the particles in the water thereby reducing or eliminating their adhesive power although they may still be brought into contact with the walls of all of the installation.

Denaturation, when it is achieved, must permit separation of the paint, preferably by decantation, in the form of a non-adhesive cake. A part of the denatured paint particles may float on the surface of the denaturation bath. It is preferable however, to arrange for the treated paint to occur as far as possible in the form of a decantate, the removal of the latter being easier.

If the problem of the denaturation of paints is particularly important in the case of solvent paints, it occurs also for the water-base paints. Even in the presence of water, these water-base paints may lead to the formation of undesirable deposits, and it is consequently necessary, as for solvent paints, to ensure their denaturation by means of suitable compositions and methods.

Few studies have hitherto been carried out on the denaturation of water-base paints. This is due in part to the fact that these paints have been developed relatively recently. This is related also to the fact that the phenomenon lends itself with difficulty to systematization. The most varied factors may influence the result of the operation. It is first the nature of the compounds used, their concentration, the pH, but also the physical conditions of dispersion, stirring, etc. By reason of the multiplicity of factors, it is practically impossible to anticipate the effectiveness or ineffectiveness of a given composition on the basis of present technical knowledge in this field. The determination of denaturating properties of a composition is necessarily dependent upon experimentation. It must also be noted that, in the field of water-base paints, numerous compounds may have a limited or even very limited denaturating effect. However the compositions resulting in industrially applicable results are on the other hand few in number.

It must also be added that independently of their denaturating role, the solutions must not have properties which would prohibit the use thereof. Thus, they must not have too corrosive an effect with respect to the materials into contact with which they may come; their cost must be as low as possible as well as their consumption . . .

Following delicate studies, Applicant has been led to put aside a considerable number of possible compositions to retain only those which have satisfactory characteristics for the denaturation of water-base paints within the field of industrial applications.

Thus it has appeared that salts with a monovalent cation and a majority of the salts with a trivalent cation do not permit one to achieve satisfactory denaturation. In the same way, it has appeared that chlorides, although effective for certain ones, should be avoided by reason of their corrosive properties with respect to metals. The presence of additional calcium cation in a denaturation solution may also have a troublesome influence by facilitating the bacterial proliferation which may be a considerable handicap, taking into account the necessary recycling of the composition used. These remarks show the diversity of questions to which Applicant had to find an answer in order to arrive at the solutions which are the subject of the present invention.

According to the present invention, it has now been shown that denaturation compositions for water-base paints, responding well to the exigencies of practice, are constituted by aqueous solutions containing effective amounts of bivalent metal sulphates of the group comprising iron, magnesium and manganese.

The denaturation solutions according to the invention contain advantageously between 1 and 10 g/l of at least one of the ferrous, magnesium or manganese sulphates. These limits, determined experimentally, are not critical in the sense that they do not define the only domain for which denaturation may be obtained, but that which responds satisfactorily to the conditions required for industrial use. For a concentration less than 1 g per liter, the denaturation of the paint still operates, but the separation of the paint particles from the water is difficult. If the concentration exceeds 10 g per liter, the separation of the paint particles is effected correctly, but the denaturation is poorer, the paint not having lost completely its adhesive power.

Preferably, the concentration of ferrous, magnesium, manganese sulphate is selected between 1.5 and 4 per liter.

The pH of the solution is kept advantageously in the vicinity of neutrality. The solutions with an acid pH cause severe attack on metal parts of the equipment and are hence to be avoided. In addition, a very basic pH is difficult to attain with solutions of sulphates, and this in spite of the basicity of customarily treated water-base paints.

In itself, the pH of the solution of one of the sulphates used according to the invention is established at values slightly below that corresponding to neutrality. This will appear in Table 1 below.

In the course of operation, the contact with the paints, for the most part basic, tends to raise the pH of the solution. In the reverse sense, the carbonatation which is carried out in contact with air tends on the contrary to lower the pH. In continuous operation, the value of the pH of the solution is normally comprised between 6.5 and 8.

The paints treated by means of the compositions according to the invention are commercial water-soluble paints, that is to say paints based on alkyds, epoxy, acrylic or polyester resins. These resins are customarily "solubilized" in water by the addition of amino groups, or again the presence of a diluent based on water-alcohol mixture. Alcohols used for this purpose are notably butanol and butyl-glycol.

The denaturation of water-base paints is produced, according to the invention, by placing the paint to be treated in contact with a denaturation composition such as defined above. Advantageously, the conditions under which contact is carried out must result, in addition to the suppression of the adhesive power of the paint, in the insolubilization of the latter, and then in permitting the separation of the denatured paint, on the one hand, and of the treatment solution on the other hand, the latter being thus available for further use.

The principal factors which ensure the sound application of the method are connected with the utilization of a solution such as that which is defined above. To ensure rapid treatment, the paint must be in a finely divided condition when it is placed in contact with the denaturation solution. This is effected in itself when the paint treated arises from overspray.

In the finely divided state, the denaturation of the paint in contact with the treatment solution is rapid. The rapidity of denaturation is advantageous in that the fine particles in contact with the treatment solution lose their adhesive power very quickly and there is no longer a risk of the formation of strongly adherent deposits. This rapid denaturation is accompanied by an equally rapid precipitation which is not always desirable from the point of view of industrial use. This is the case in particular when the spraying installation has not been designed exclusively for the settling of a water-base paint. In this case, if the previously indicated denaturation solutions are used as such, the precipitation can occur outside of the areas provided for this purpose, which substantially complicates the maintenance of the installation.

It is hence desirable, whilst preserving the excellent denaturation properties of these solutions, to arrange that it is possible to control the conditions under which the precipitation takes place, and in particular the speed of precipitation.

To reach this objective, denaturating solutions are used such as above described to which is added an effective amount of a surface active agent of the type of polyether of the form

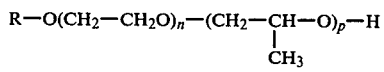

in which R is an alkyl, aryl, aryl-alkyl or alkyl-aryl group, containing at least 10 carbon atoms, and n and p are whole numbers of which one may be zero, $n+p$ being comprised between 12 and 100.

It is understood in the preceding formula, the distribution of the ethylene oxide and isopropylene oxide units may be of any type.

Preferably, the surface active agents used have a total number of ethylene oxide and isopropylene oxide units comprised between 16 and 30.

These surface active agents are available commercially and may be produced by the addition to an alcohol or a phenol of ethylene oxide and/or propylene oxide. These agents are often presented commercially in the form of mixtures of homologous products. They are identified by the nature of the R group, in particular the number of carbons that it contains and the number of ethylene oxide or propylene oxide units. Preferred commercial compounds are notably the following compounds:

| | Number of carbons in R | Number of ethylene oxide groups | Number of propylene oxide groups |
|---|---|---|---|
| alkyl | 16–18 | 22 | |
| " | 16–18 | 16 | |
| " | 10–12 | 5 | 7 |
| " | 13 | 10 | 6 |
| " | 16–18 | 20–25 | |
| alkyl-aryl | $C_9H_{19}$—$C_6H_4$—(nonyl-phenyl) | 13–16 | |
| " | " | 23 | |
| " | " | 30 | |
| " | " | 100 | |
| " | $C_{12}H_{25}$—$C_6H_4$—(dodecyl-phenol) | 14 | |
| " | " | 20 | |
| " | " | 23.5 | |
| " | $(C_9H_{19})_2$—$C_6H_3$—dinonyl-phenol | 16.5 | |
| " | " | 26 | |

The choice of the surface active agent is guided of course as a function of its effectiveness and takes into account also the conditions under which it is employed. Thus, in order to ensure good solubility of this agent, the hydrophilic part must contain a sufficient amount of ethylene oxide and/or propylene oxide links, whence the lower limit indicated. If this same number of links increases considerably, the properties of the surface active agent appear less satisfactory. For this reason, it is preferable not to exceed 100 units of ethylene oxide or propylene oxide per molecule.

The presence of the hydrophobic part of the surface active agent, constituted by the group R, products equilibrium of the hydrophilic/hydrophobic character of the agent and is also an important factor in the effectiveness of the product. In practice, it is advantageous for the part to have at least ten carbon atoms. Of course, the importance of the group R must remain within a limit beyond which the product would become practically insoluble. In practice, the number of carbons of the group R is comprised between about 10 and 30.

The presence of the surface active agent in the denaturation solution, according to the invention, is accompanied by various effects. The paint particles in the denaturation solution are better dispersed, finer. As a result there is more intimate contact between the particles and the denaturating solution, and consequently, better treatment is ensured. The best dispersion of the particles and their smallest sizes lead also to less rapid precipitation.

It is self-evident that, in practice, the dispersion must not be such that the decantation necessitates a very long dwell time in the decanters. The choice of optimal conditions is controlled by two opposing requirements. The decantation must not take place too soon, that is to say before the solution loaded with paint has arrived at the precipitation areas, but once in this part of the installation, it is desirable that it should occur sufficiently rapidly so that the overall volume of solution applied (and in particular that corresponding to the solution held in the precipitation tanks) should not be too great.

The choice of precise composition for the denaturation solution results consequently from a compromise. In particular, the amount of surface active agent used is a function of the greatest or least speed desired for the decantation. Approximately, it is possible to say that, when the amount of surface active agent increases, decantation has a tendency to occur more slowly. However, beyond a certain content, the supplementary addition of surface active agent no longer substantially modifies the conditions of dispersion and decantation within the denaturation solution. Thus as a general rule, it is not useful to exceed an amount of surface active agent of the order of 5 g/l.

On the other hand, the effect of the surface active agent may be substantial for relatively low contents.

Advantageously, denaturating solutions containing from 0.4 to 4 g/l of at least one of the surface active agents indicated above are used, and preferably solutions containing between 1 and 2 g/l surface active agent.

By way of indication, it is considered in practice that the decantation is rapid when it is practically completed in an hour or less. In the absence of any surface active agent, the decantation occurs almost instantaneously. The addition of surface active agent under the same conditions (same paint, same denaturation agent, etc.) enables the decantation time to be increased, for example up to 24 hours. All the intermediate conditions are realizable, as has been stated, by adjusting the composition of the solution.

The use of surface active agents in the denaturation solution, outside of its influence on decantation, may present certain advantages. For example, in paint booths, the solution used for the denaturation collects not only the sprayed paint entrained by the circulating air, but also a certain amount of paint in the form of "runs". These runs are formed particularly on passing through the grating located at the bottom of the booth. It is observed that these paint runs or drippings, which occur at the start in compact form when they fall into the solution, are gradually removed when the surface active agent is used. In this way the formation of undesirable deposits by accumulation of these runs is considerably reduced.

According to the treatments contemplated, it may be advantageous to introduce into the denaturation composition certain adjuvants improving the conditions of utilization.

It is notably useful to add to the denaturation solution of anti-foaming agent. The water-base paints have in fact a tendency to cause an abundant formation of foam. This foam formation is caused in particular by the dilution in the water of the amines used for solubilizing the water-base paint resins.

Besides the use of surface active agents in denaturation solutions according to the invention can result in foam formations.

In fact, when these foams appear and are an impediment to treatment, it is possible to prevent their formation, or even to make them disappear if necessary, by adding small amounts of suitable annti-foaming agent. It is possible to use, for example, fatty acid esters or compounds based on mineral oils. In general, although the amount of anto-foaming agent used varies according to the surface active agent and paint treated, some parts per million suffice to combat effectively the foam formation. The anti-foaming agent is added when this is necessary and, preferably, at the very place in the bath where the foam tends to appear. This addition is effected preferably continuously. The amounts used always remain very low with respect to the whole of the bath.

It is also possible to add to the denaturation solution agents traditionally used to prevent corrosion such as, for example, thiourea or its derivatives, notably diphenyl thiourea. Corrosion phenomena having a tendency to manifest themselves principally at the beginning of operations, it is particularly at this moment that the inhibitor must be present in the bath. These agents may be used in the amounts customarily relied on for this type of application. A concentration of the order of 1 to 2 g/l of diphenyl thiourea is preferred at the start. This concentration may then be reduced substantially and it is advantageously kept in the vicinity of 0.5 g/l.

It is important to avoid the proliferation of microorganisms in these solutions which are recycled. Although the solutions according to the invention do not favor this proliferation, it is preferable to add a small amount of a bacteriocidal agent, for example an agent based on formol introduced in the proportion of 0.1 to 0.2% of the volume of the solution, at least during the periods when the risk of proliferation is greatest, that is to say in summer, when the temperature and the light intensity are high. At other periods of the year, the bacteriocidal content may be substantially less. It may even be eliminated altogether.

It happens that a portion of the paint to be treated remains at the surface of the bath. Mechanical stirring enables the majority of these floating paint particles to be resuspended.

The decantation of the solution according to the invention leads to a deposit of very friable compact denatured paint which does not stick.

To eliminate the little amount of floating paint especially if the bath has been stirred at the surface to facilitate precipitation, periodic "skimming" may be carried out.

The decantation can be more or less prolonged. If, in addition, the bath is skimmed, the elimination of the treated paint may be practically complete. The solution thus obtained is very little loaded with residual paint. It may be recycled as is, supplementing it from time to time to compensate for the inevitable limited consumption, due more to the water vaporisation and sometimes entrainment than to the denaturation itself. It is thus possible to drop below a consumption of 15 grams per kilogram of treated paint.

EXAMPLE 1

In a beaker of 500 cm$^3$, are placed 300 cm$^3$ of denaturation solution prepared from different salts whose nature and content are indicated in Table 1 below. Slowly and with stirring, 3 g of paint based on alkyd resins and acrylic resins modified with melamine are added.

The quality of the denaturation is evaluated by a notation from 0 to 10, the notation 0 corresponding to the almost total absence of denaturation and the notation 10 to complete denaturation.

In Table 1, the pH of the solution used before the latter comes into contact with the paint is also indicated.

By way of comparison, there are gathered in Table 1 the test results obtained with other salts than those which are the subject of the compositions according to the invention, in particular salts with mono and trivalent metal cations.

TABLE 1

| Solution | Concentration of the salt in g/l | pH | Denaturation |
|---|---|---|---|
| $Na_2SO_4, 10 H_2O$ | 2 | 7 | 1 |
| K Cl | 2 | — | 1 |
| $NH_4NO_3$ | 2 | — | 3 |
| $Al Cl_3, 6H_2O$ | 2 | 4 | 8 |
| $Cr Cl_3, 6H_2O$ | 2 | 6 | 4 |
| $Mg SO_4, 7H_2O$ | 2 | 5 | 8 |
| $Mg SO_4, 7H_2O$ + CaO (0.2 g/l | 2 | 9 | 6 |
| $Mg SO_4, 7H_2O$ + NaOH to pH 9 | 2 | 9 | 7 |
| $Fe SO_4, 7H_2O$ | 2 | 5.5 | 10 |
| $Mn SO_4$ | 2 | 6 | 10 |

On studying these results, it is observed that, generally, the metal salts with a monovalent cation are ineffective or of little effectiveness in comparison with salts coming within the scope of the compositions according to the invention.

Sulphates are preferred to chlorides, although the latter lead to good denaturation, by reason of their less corrosive character.

Calcium salts are avoided by reason of their tendency to favor bacterial proliferation.

Similar tests to those recorded above have been carried out by varying the salt concentration in the solution. These tests have shown that the denaturation is satisfactory for a whole range of concentrations from 1 to 10 g/l, and especially between 1.5 and 4 g/l for the salts used according to the invention.

EXAMPLE 2

The solution containing:
3 g/l Mn $SO_4$, $H_2O$
1.5 g/l of thiourea
1 $cm^3$/l of formol
was tested to determine its effectiveness in a paint booth.

The experimental booth was equipped with a ventilator, a washer and a flow channel. In operation, the flow rate of the solution running over the walls and into the washer was 4 $m^3$/h. The flow rate of air was 1500 $m^3$/h.

The paint treated was based on acrylic resin modified with melamine.

Good denaturation was observed and almost total decantation. Slight flotation of the treated paint, in the flow channel, in the form of a fine discontinuous film was eliminated by using a stirrer.

EXAMPLE 3

Several tests were carried out with the same solution as in the preceding example in a larger experimental booth, of the type used in the automobile industry and having a ground surface of 6 $m^2$, and equipped with a washer under the grating. A portion of the recycled solution was sent to a decanter.

A mixture of paints containing alkyd resins and acrylic resins modified with melamine were treated in this way.

In general, it was observed that the paint was well denatured and that the paint agglomerates on the surface were friable and easily dispersed. They were constituted of denatured paint with trapped air bubbles.

The paint particles trapped by the bath water form a solution of which the major portion had a high sedimentation rate (of the order of 1 mm/second) and a very small portion had a tendency to float.

The paint in suspension decanted to at least 60%. If the surface of the bath was stirred, there was almost no supernatant liquid; the bath was almost clear, there was practically no paint in suspension.

In continuous operation, the amounts of manganese sulphates necessary to maintain the concentration of the bath at about 3 g per liter were evaluated. This amount was of the order of 15 g of manganese sulfate per kilogram of paint treated.

A similar test in the same equipment but using a solution containing 1.5 g/l instead of 3 g/l of manganese sulphate leads also to satisfactory results.

EXAMPLE 4

In a booth of length 6 m, width 4 m, containing a bath of 15 $m^3$ and equipped with a decanter of 10 $m^3$, was introduced a solution containing 3 g per liter of manganese sulphate, 1.5 g per liter of thiourea and 1.5 g per liter of bacteriocide. In the course of operation, only the additions of manganese sulphate and of thiourea were effected. The concentration of the latter could be lowered to 0.5 g per liter.

The booth was kept in operation for two months. On to small parts, mixtures of three types of water-base paint were sprayed (containing respectively alkyd, acrylic and polyester resins, the latter in relatively small amounts) at the rate of 300 k of paint per day. The amount of paint submitted to the washer, and hence treated, was about 200 kg each day.

Complete denaturation of the paint and almost total decantation was observed, the paint being essentially collected at the base of the decanter. This test enabled it to be shown that the recycling of the solution was possible without any reject, and that, under these conditions, the product consumption was very limited.

EXAMPLE 5

A sampling of water-base paints was carried out from commercial products obtained from various manufacturers. Among these paints, some are in solution form, others are in emulsion form, some are based on alkyd resins, others are based on polyester resins or acrylic resins; there are also primers, conventional lacquers and metallized lacquers. The choice made was representative of the principal families of so-called "water-base" paints.

A solution containing 3 g/l of manganese sulphate and 2 g/l of ethoxylated nonyl-phenyl with 23 ethoxy groups was prepared. With this solution, a series of beakers were filled. Into each of these beakers, the solution being constantly stirred, the sample of one of the paints selected was introduced in the proportion of 10 to 20 g liter of solution.

After a quarter of an hour of stirring, the solution containing the paint was left to stand and the quality of the denaturation and of the decantation of the paint was observed after 24 hours of standing.

Table 2 gathers the results obtained.

The evaluation of the results was based on four characteristics of the solution after treatment (dispersion, denaturation and decantation of the paint particles and appearance of the supernatant liquid) as a function of criteria indicated in Table 3.

TABLE 2

| Paint | | Appearance of the paint after treatment and standing for 24 h | |
|---|---|---|---|
| Designation | Type of resin | Dispersion Denaturation | Decantation Supernatant liquid |
| Yellow primer | alkyd | DS +++ | DC +++ |
| | | DN +++ | SN +++ |
| Grey lacquer | alkyd | DS +++ | DC +++ |
| | | DN +++ | SN ++ |
| Black lacquer | alkyd | DS +++ | DC +++ |
| | | DN +++ | SN + |
| Beige lacquer | polyester | DS + | DC +++ |
| | | DN +++ | SN +++ |
| Metallized grey enamel | alkyd | DS ++ | DC +++ |
| | | DN +++ | SN ++ |
| Grey primer | alkyd | DS +++ | DC ++ |
| | | DN +++ | SN + |
| Chamois primer | alkyd | DS +++ | DC ++ |
| | | DN +++ | SN ++ |
| Yellow primer | polyester | DS + | DC +++ |
| | | DN +++ | SN +++ |
| Chestnut enamel | alkyd | DS ++ | DC +++ |
| | | DN +++ | SN ++ |
| White enamel | alkyd | DS ++ | DC ++ |
| | | DN +++ | SN ++ |
| White enamel | polyester | DS +++ | DC ++ |
| | | DN +++ | SN + |
| White lacquer in emulsion | acrylic | DS +++ | DC ++ |
| | | DN +++ | SN + |
| White lacquer | polyester | DS ++ | DC +++ |
| | | DN +++ | SN ++ |
| Black lacquer | alkyd | DS ++ | DC +++ |
| | | DN +++ | SN ++ |
| Grey lacquer | polyester | DS ++ | DC +++ |
| | | DN +++ | SN + |
| White lacquer | acrylic | DS +++ | DC ++ |
| | | DN +++ | SN φ |
| Beige lacquer | alkyd | DS ++ | DC ++ |
| | | DN +++ | SN + |

TABLE 3

| Coding | DS Dispersion | DN Denaturation | DC Decantation | SN Supernatant liquor |
|---|---|---|---|---|
| φ | paint not dispersed | paint not denaturated, which adheres to the walls of the beaker | paint which does not decant or which becomes supernatant | supernatant very charged with paint and color |
| + | paint partly dispersed in flocks | paint little denaturated which adheres to the magnetic stirring bar | paint which only decants very little and partially | supernatant liquor charged to an average degree by fine particles of paint and color |
| ++ | Well dispersed paint | paint apparently denaturated but which sticks to the fingers after mixing | paint which decants well but slowly | supernatant liquor almost clear but colored |
| +++ | paint very finely dispersed | paint well denaturated, not adhesive even after mixing | paint which decants very well and rapidly | supernatant liquor clear |

In all cases, the paint is well dispersed and denaturated. The paint decants completely and relatively slowly.

Similar tests were reproduced in the cases where the decantation was particularly slow, using 1 g/l of the surface active agent instead of 2 g/l. Under these conditions, a reduction in the decantation time was observed and a decrease in the loading of the supernatant liquid.

EXAMPLE 6

The influence of the concentration of the surface active agent was determined on the treatment effected. In this series of tests, the denaturating solution was constituted with amounts of manganese sulphate and surface active agent ($C_{12}$ alcoholic ether comprising 17 epoxy units per molecule) indicated in the following Table 4.

TABLE 4

| Beaker tests with variable concentrations of surface active agent | | |
|---|---|---|
| Number of the Test | $MnSO_4$ in g/l | Surface active agent in g/l |
| 1 | 3 | 0 |
| 2 | 3 | 0.02 |
| 3 | 3 | 0.04 |
| 4 | 3 | 0.06 |
| 5 | 3 | 0.12 |
| 6 | 3 | 0.24 |
| 7 | 3 | 0.48 |
| 8 | 3 | 1 |
| 9 | 3 | 2 |
| 10 | 3 | 4 |
| 11 | 6 | 1 |

The results obtained by means of these solutions were as follows:

When there was no surface active agent, a well denaturated paint was obtained but which decanted in the form of flocks of about 1 mm. The supernatant liquor, after decantation, is clear. The decantation was very rapid.

The concentration of surface active agent of the solution increasing, the flocks become finer and finer, then disappear to give very fine and well dispersed particles, whilst the supernatant liquid becomes more and more cloudy and charged with paint, and the decantation slower and slower. The denaturation remained satisfactory.

It was also observed that, with 6 g/l of denaturating agent such as the manganese sulphate, a mixture of fine precipitate and coarse flocks of paint was obtained, and on the whole, the denaturation was poorer than with solutions of 3 g/l whilst remaining satisfactory.

Taking into account these results, it is clear that by varying the concentration of a surface active agent in the solution, a convenient method is provided for modifying optionally the speed of decantation and the appearance of the denaturated paint particles.

EXAMPLE 7

This test was carried out in a paint booth of 10 m³ with which was associated a decanter for the recovery of the paint after the latter had been denaturated. In this installation, a part of the denaturation solution charged with paint is directed to the decanter whilst the remainder of the solution, readjusted with the decanted solution and/or the fresh solution, was sent back to the painting booth.

The use in this booth of a solution containing 3 g/l of manganese sulphate leads to effective denaturation of the water-base paints. However, the formulation of coarse "flocks" of paint results in rapid decantation in the pit located below the booth. It was then necessary, to remove the denaturated paint, to interrupt painting operations to proceed with draining of the pit.

By adding the surface active agent applied in Example 2 (2 g/l) to the denaturating solution, the results of the denaturation and of the decantation of the paint were very satisfactory; the paint, being better dispersed in the bath, decanted less rapidly. Almost the whole of the denaturated paint was collected at the base of the decanter, in the form of a compact flock and without adhesive power. It was removed without difficulty and without needing to drain the pit below the booth.

We claim:

1. Method for the denaturation of water-base paints, characterized in that the paint is contacted with and dispersed in a solution containing between 1.5 to 10 g/l of at least one sulphate of iron (II), of magnesium or of manganese and at least one non-ionic surface active agent corresponding to general formula $$R-O(CH_2-CH_2-O)_n-(CH_2-CH(CH_3)-O)_p-H$$

in which R is an alkyl, aryl, aryl-alkyl or alkyl-aryl group, containing at least 10 carbon atoms, and n and p are whole numbers of which one may be zero, and n+p being comprised between 12 and 100, said solution having a pH during use of between 6.5 and 8.0.

2. The method according to claim 1, characterized in that the iron (II), magnesium or manganese sulphate content is comprised between 1.2 and 4 g/l.

3. The method according to claim 1, characterized in that the sum n+p is comprised between 16 and 30, and the group R contains from 10 to 30 carbon atoms.

4. The method according to claim 1 or claim 3, characterized in that the surface active agent is introduced into the solution in the proportion of 0.4 to 4 g/l.

5. The method according to claim 1 or claim 3, characterized in that the surface active agent is introduced into the solution in the proportion of 1 to 2 g/l.

6. The method according to claim 1, characterized in that the surface active agent is introduced into the solution in an amount of 0.4 to 4 g/l.

7. The method according to claim 1, characterized in that solution comprises, in addition, an anti-foaming agent.

8. The method according to claim 1, characterized in that solution comprises, in addition, a corrosion inhibitor.

9. The method according to claim 8, characterized in that the corrosion inhibitor is a thiourea or a substituted thiourea.

* * * * *

Disclaimer

4,294,617.—*Philippe Schlicklin, Nancy; Anne-Marie Mertzweiller nee Maillard, Maidieres* and *Jacques Ploussard,* Pont a Mousson, France. COMPOSITIONS AND METHODS FOR THE DENATURATION OF WATER-BASE PAINTS. Patent dated Oct. 13, 1981. Disclaimer filed Mar. 2, 1982, by the assignee, *Air Industrie.*

Hereby enters this disclaimer to claim 4 of said patent.

[*Official Gazette May 4, 1982.*]

UNITED STATES PATENT AND TRADEMARK OFFICE
CERTIFICATE OF CORRECTION

PATENT NO. : 4,294,617
DATED : October 13, 1981
INVENTOR(S) : SCHLICKLIN et al

It is certified that error appears in the above—identified patent and that said Letters Patent are hereby corrected as shown below:

Claim 6, line 1, after "1" insert --or Claim 3--.

Signed and Sealed this

Sixth Day of July 1982

[SEAL]

Attest:

GERALD J. MOSSINGHOFF

*Attesting Officer*    *Commissioner of Patents and Trademarks*